Nov. 18, 1952

H. A. OSBORNE 2,618,727

AUTOMATIC WELDING MACHINE

Filed Dec. 21, 1950

INVENTOR
HORACE ADRIAN OSBORNE
BY
ATTORNEYS

Nov. 18, 1952     H. A. OSBORNE     2,618,727
AUTOMATIC WELDING MACHINE
Filed Dec. 21, 1950

INVENTOR
HORACE ADRIAN OSBORNE
ATTORNEYS

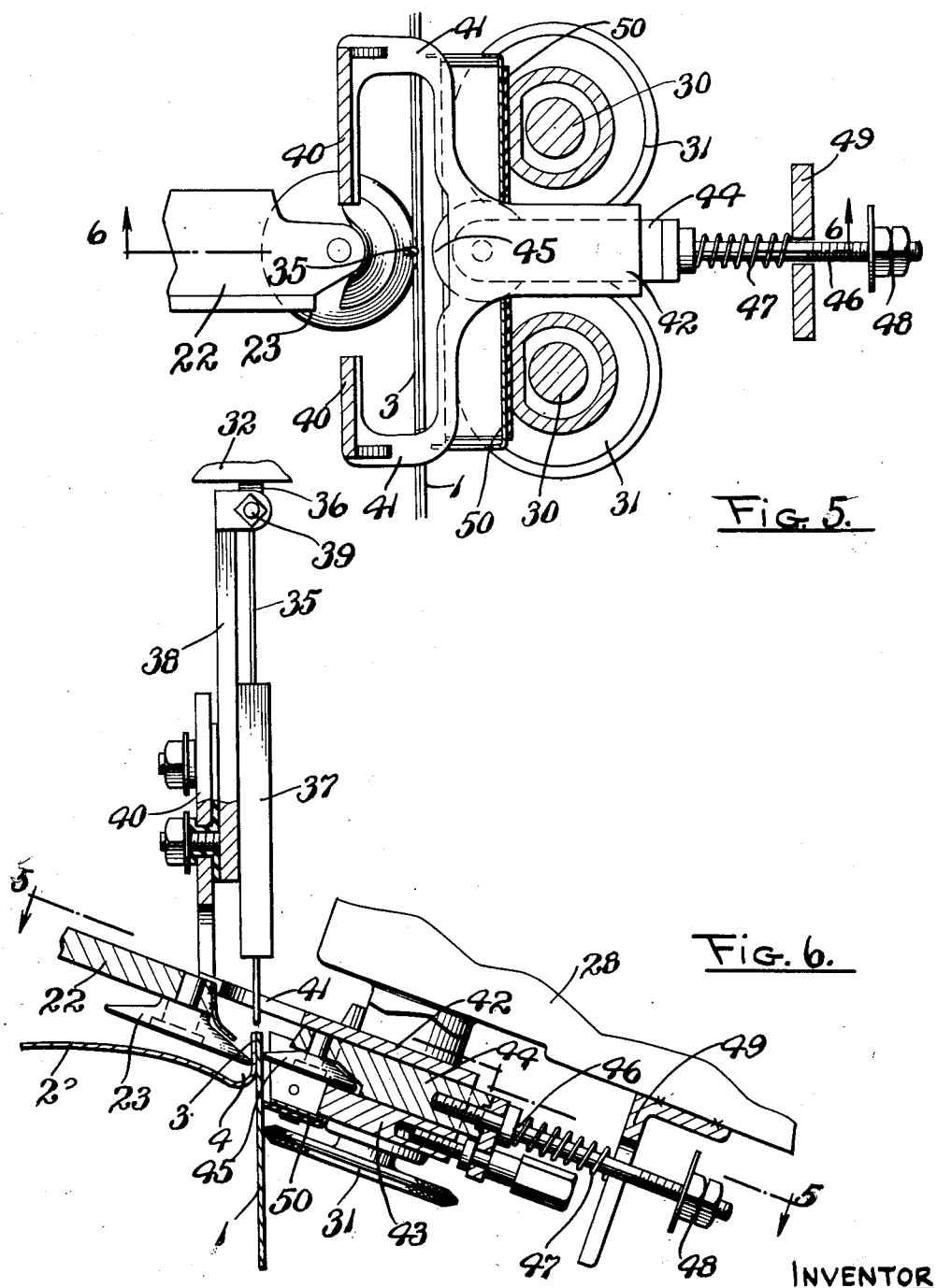

Patented Nov. 18, 1952

2,618,727

UNITED STATES PATENT OFFICE 2,618,727

AUTOMATIC WELDING MACHINE

Horace Adrian Osborne, Frankfort Township, Will County, Ill., assignor to Morton Manufacturing Company, Muskegon Heights, Mich., a corporation of Michigan Application December 21, 1950, Serial No. 202,011

8 Claims. (Cl. 219—8)

This invention relates to a novel, practical and very useful machine for fusingly connecting and joining sheet metal parts and which in practice has been used for securing sheet metal closures to the ends, particularly the bottoms of sheet metal tanks, drums or similar containers. Such machine operates automatically and provides a very secure and tight connection, joining metal shapes and closures of sheet metal tanks or similar products.

Such metal products, containers or vessels may be of rectangular, circular, oval, elliptical, triangular or similar shapes and are frequently in the form of a tank which has parallel sides and semi-circular ends used for basement oil storage tanks and known generally as out-of-round in shape. The invention is employed particularly in welding the enclosures or heads in assembly with the body or cylinder or other shape of walls, which may be out-of-round, but is not confined to welding or to the particular shape of vessel but is applicable to all shapes and all types of joints and includes in general the various ways of joining such metal parts together, such as welding by electric arc, flame, gas, or other heat producing unit for procuring welded, fused, brazed or soldered joints, with the use of additional metal, or only the fusing of the members which are connected.

In my invention, a novel, practical and efficient means of compelling, controlling and correctly locating the electric arc flame, gas or other heat producing unit with reference to the work is provided and is arranged to propel the joining, welding or fusing unit at a continuous and even rate of speed, or at variable speeds with acceleration or deceleration if wanted.

It is a further object of the invention to provide novel mechanism which, through operative arrangement of the product to be produced, directs, controls and monitors both the welding material and the heat supplying unit or electrical current unit used in joining, fusing or welding the parts together and to keep them in desired location at all times with respect to the fused, welded, brazed or other jointed connection made. These mechanisms direct, control and monitor the wire, metal, metal rod, the flame, arc or current, whether they are propelled along the path to be made or whether the joint is propelled past them.

For the purpose of the disclosure of my invention in a practical manner and one which has been made, tested and sold, the following description and the accompanying drawings illustrate a joint made by the welded connection of an end closure to a tank which may be of out-of-round form, the connection being by an electric submerged arc welding. The propelling and monitoring means is one however of wide application, and is not restricted to electric arc welding, which is one example of what, herein, may be termed generally as fused metal joint production.

Fig. 5 is a horizontal section and partial plan, the section being taken on the plane of line 5—5 of Fig. 6.

Fig. 6 is a vertical section through the welding unit at its place of engagement with the work, the section being taken on the plane of line 6—6 of Fig. 5.

Like reference characters refer to like parts in the different figures of the drawing.

Figure 2:
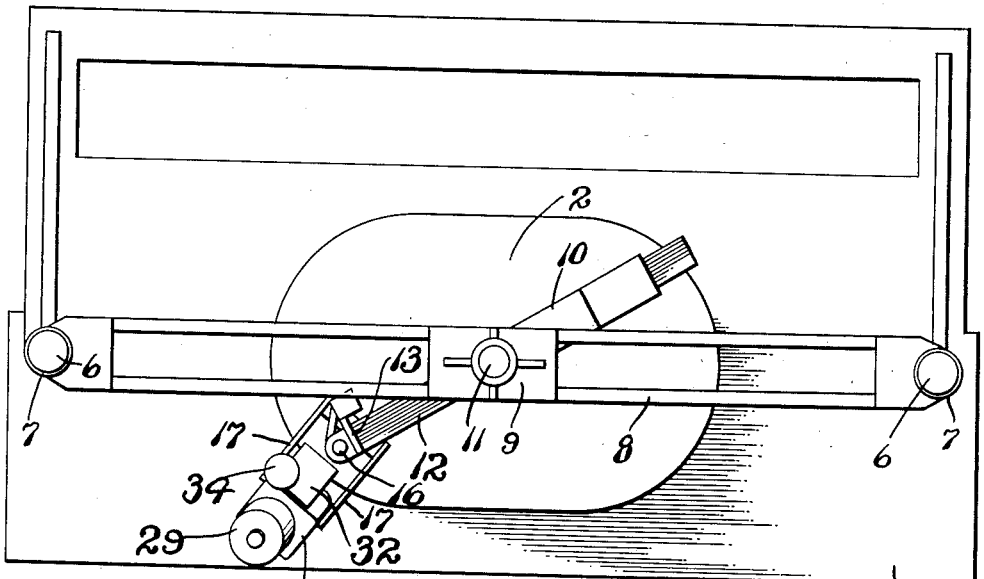
Fig. 2 is a plan view thereof.
Figure 9:
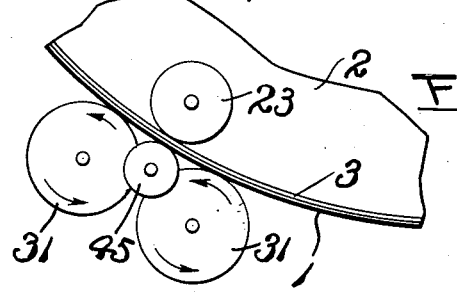
Fig. 9 is a similar diagrammatic plan with the parts in tank engaging position as in Fig. 4.
Figure 10:
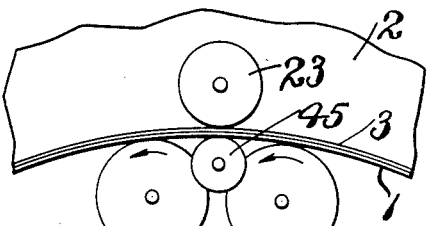
Fig. 10 is a view similar to Fig. 9 wherein the welding unit is used with an article of reverse curvature.

In the disclosure of the present invention, it is shown as used for welding an end closure plate in an open end of a tank 1. The end closure 2 is formed around its edges with a continuous upturned flange 3 and a downwardly extending annular trough within such flange 3. The flange 3, when the end member 2 is inserted in the end of the tank 1, lies snugly against and at the inner side of the walls of the tank at its upper end in parallel relation thereto. As shown in Fig. 2, the tank is illustrated as one having spaced parallel sides connected by semi-circular ends, though with my invention, other forms and shapes of tanks or like receptacles may have the end closures welded therein.

The tank body 1 is placed at its lower end upon a base 5 of a fixture. At opposite ends of the base 5 posts 6 extend vertically upward. Elongated sleeves 7 are telescoped over the posts 6 and may be adjusted thereon to desired positions, depending upon the height of the tanks 1 or other receptacles which are to be processed. Horizontal spaced bars 8 parallel and spaced a short distance from each other are connected at their ends to the sleeves 7. It is on these bars that the welding unit and its mounting are carried.

An adjustable fixture 9, mounted on the bars 8, between their ends and extending downwardly therethrough, serves as a carrier for a carriage 10 below the bars 8. The carriage 10 at its upper end is provided with a swivel pin mounting 11 much may turn about its vertical axis in the member 9, which provides a bearing therefor. The carriage 10 at its lower portion has tracks for the sliding mount of a horizontal bar 12 which may move back and forth in the direction of its length on anti-friction bearings shown in Fig. 1. At one end of the bar 12, the immediate welding unit is permanently secured.

It is apparent from this structure that the carriage 10 may swing about the vertical axis of the pin 11 through a complete circle and that the bar 12 may move horizontally back and forth on the carriage so that the welding unit carried at an end of the bar 12 is capable of taking all of the positions necessary as it is moved around the upper end of the tank 1, its movements taking place automatically, as hereafter described, through the driving engagement of the welding unit with the outer surface of the tank 1.

At the end of the bar 12 where the welding unit is secured (Fig. 3), a vertical bar 13 is welded which, near its upper and lower ends, is provided with two spaced apart guiding sleeves or journals 14 and 15 the latter at the lower end of the bar 13. Through these sleeves or journals a vertical shaft 16 passes and is free for rotative or turning movement therein. At the lower end of the shaft 16 below the bar 13 spaced bars 17 are fixedly secured which lie horizontally and are fixed with respect to the shafts 16.

A cylinder 18 adapted to receive pressure fluid such as oil or other hydraulic liquid, or compressed air, is secured to and carried by the bar 13 at its upper portion. A piston within the cylinder has connected thereto a piston rod 19 passing through the lower end of the cylinder and through one end of an arm 20 through the other end of which the shaft 16 passes. A collar 21 above the arm 20 is securely fastened to the shaft 16.

When the pressure fluid is entered in the lower end of the cylinder 18, rod 19 and attached arm 20 are lifted and coming against the collar 21 lift the shaft 16 and any parts carried thereby. On release or exhaust of pressure from the lower end of the piston 18 the parts will move downwardly by gravity until the arm 20, at the place where the shaft 16 passes therethrough, comes against the lower sleeve 15 which serves as a stop against further downward movement (see Fig. 4). The upward movement in general is stopped by the use of a predetermined quantity of fluid pressure supplied to the cylinder 18.

A bracket support 22 is permanently fixed in connection with the bars 17, extending downwardly therefrom directly below shaft 16. At its under side and inner portion, a pilot wheel 23 is mounted to turn about an axis located at an acute angle to the vertical as shown, such wheel, in practice, during the operation of the machine, bearing against the inner side of the flange 3 of the end closure member 2, near its free edge.

At one end of the bars 17 and at their lower edges a horizontal plate 24 crosses from one to the other and is welded thereto, on which, through a suitable fixture, one end of a cylinder 25 is pivotally mounted, from which a piston rod 26 extends having a universal connection at the lower inner corner of a plate 27 pivotally suspended from the opposite end of the bar 17 and fixedly connected to a reduction gear housing 28 at the upper side of which an electric motor 29 is mounted. The shaft of the motor 29 extending into the reduction gear housing 28 drives two spaced apart short shafts 30 (Fig. 5) at the lower inner portion of the housing 28. At the lower end of each shaft 30 is a driving wheel 31, narrow in width and having peripheral edges to engage with the tank 1 at its outer side, a short distance below its upper end as shown in Fig. 6. The speed of rotation of the shaft or motor 29 is greatly reduced by reduction gearing within the housing 28 so that the rotative speed of the shafts 30 is low. Such reduction of speed from the shaft of an electric motor to other shafts driven by it is common and well known. Also the motor is one which may be driven at variable as well as at constant speeds.

A welding rod feeding and control unit, indicated generally at 32, is connected by a bracket 33 with the shaft 16 moving with it. It is driven by an electric motor 34 for feeding the welding rod 35 downwardly. This welding rod feeding and other control is not new but is an old and well known structure to which no claim is made and needs to be shown and disclosed only generally in connection with this invention, though essential for use with it. The rod 35 which may be of any practical length, passes downwardly through guide 36 at the lower end of the welding rod control housing 32 and thence through a guide 37, so that at its lower end during welding, it will be at a proper distance above the edges of the wall 1 of the tank body and of the flange 3 of the end closure 2, to strike an arc and maintain the lower end of the rod at such arch producing position, as the lower end of the rod is melted and deposited on the edges of body 1 and flange 3.

The guide 37 through which the lower portion of the welding rod 35 passes is secured at a side of a depending supporting bar 38, pivotally mounted at 39 at its upper end on the part 36. A fixture including a vertical bar 40 is connected to the bar 38 at its opposite side, and insulated therefrom. The lower end of the bar or plate 40 is divided so that it may pass to each side of the mount 22 for the pilot wheel 23 (Fig. 5) and at its lower edge a horizontally inclined fork is permanently secured, having spaced fork members 41 integrally joined with a housing guide 42 at the under side of which is a member 43 spaced therefrom.

A block 44 is received in the guide housing and is equipped with an idle locating roller 45 which is positioned substantially opposite the pilot roller 23. From the outer end of the block 44 a rod 46 extends, around which is a coiled compression spring 47, and at the free end of which nuts 48 are threaded thereon. The rod 46 passes between the sides of a divided bracket arm 49 permanently connected to and extending downwardly from the reduction gear housing 28.

A holder or retainer 50 for welding flux is secured in position, as shown in Figs. 5 and 6, so that it will be located at the outer side of and near the upper end of the walls of the tank body 1 having connection with the guide for the member 44. It is covered with a flexible rubber covering 51, the free edges of which will come against the outer side of the tank body 1 during the period that welding occurs.

When welding occurs, suitable welding flux, in powdered form indicated at 52 (Fig. 7) is continuously supplied by gravity through a conducting pipe 53 therefor which is suitably connected with a supply source and mounted to move with the welding unit and deposit flux in the holder 50 ahead of the welding rod 35. Such flux covers the upper edges of the wall of the body 1 and of the flange 3 and is received in the trough at 4 located around the edge portions of the end closure 2. The welding arc caused by the jump of electric current from the lower end of the rod 35 to the metallic members 1 and 3 of the tank is within the flux or, as it is known, the arc is a submerged arc, that is, covered by the flux with an exclusion of oxygen from the air which, if not excluded, would cause burning or scaling of the metal parts welded together and defective welding. Also in other types of welding, fusing generally, brazing, etc., the joint connection of the parts may be suitably insulated from oxygen of the air, by gas such as helium or other inert gas directed to the space shown occupied by the flux 52.

Figure 3:
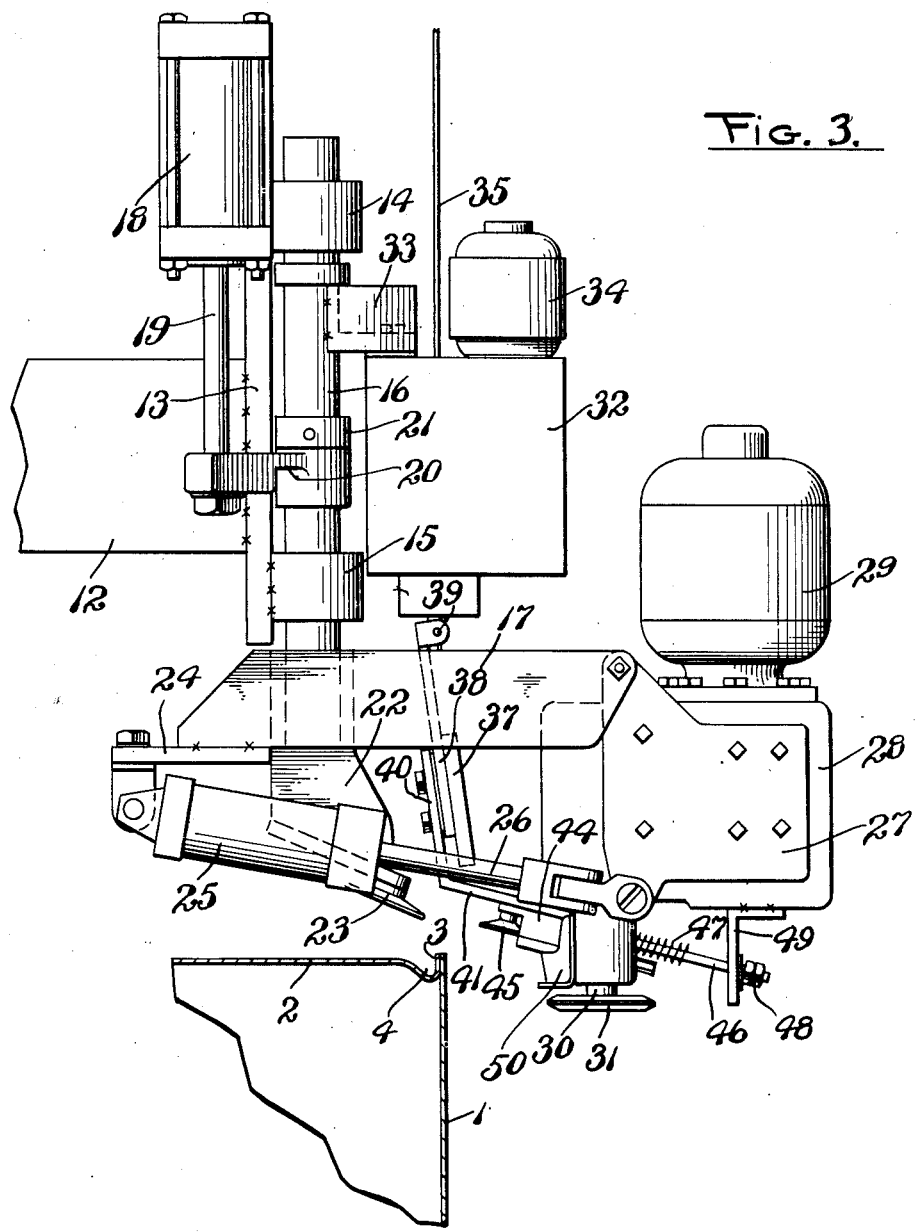
Fig. 3 is an enlarged side elevation of the immediate welding unit, slightly elevated above the upper end of a tank and the end closure to be secured therein, shown below it fragmentarily in vertical section.

The axis of the pin 11 may be disposed as near as possible above the vertical center line or axis of the tank 1, though if it is not, but is practically close to it, it will not affect the successful carrying out of the welding operation. The tank body 1 with the end closure 2 inserted at its upper end is put in place with the welding unit in elevated position, as in Fig. 3, the upper edges of the walls of the body 1 and of the flange 3 being located substantially directly below the lower end of the vertical welding rod 35. Such elevation to upper position, as in Fig. 3, is by the introduction of pressure fluid into the lower end of the cylinder 18.

Figures 1, 7:
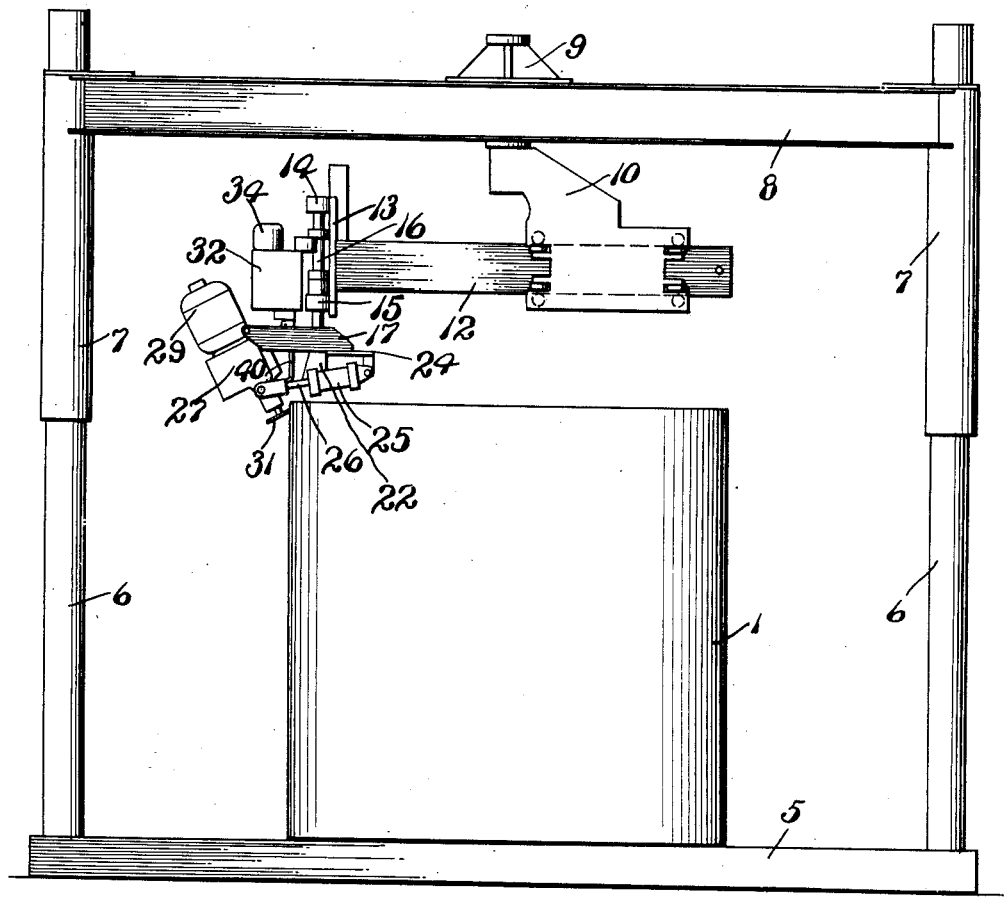
Fig. 1 is an elevation, showing a tank and the welding unit associated therewith, and the manner in which an end closure is welded in place in the upper end of the tank.
Fig. 7 is a fragmentary enlarged vertical section, substantially at the same plane as the sectional view shown in Fig. 6, showing the position of the parts during welding and the flux which is used and in which the arc is submerged.
Figure 8:
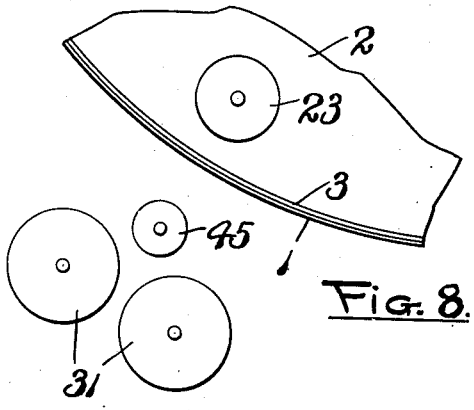
Fig. 8 is a diagrammatic plan view illustrative of the relative positions of the driving and engaging rollers of the welding unit which engage with the tank and its upper end closure, for moving the welding unit around the tank, when the parts are in the position shown in Fig. 3 above the tank.
Figure 4:
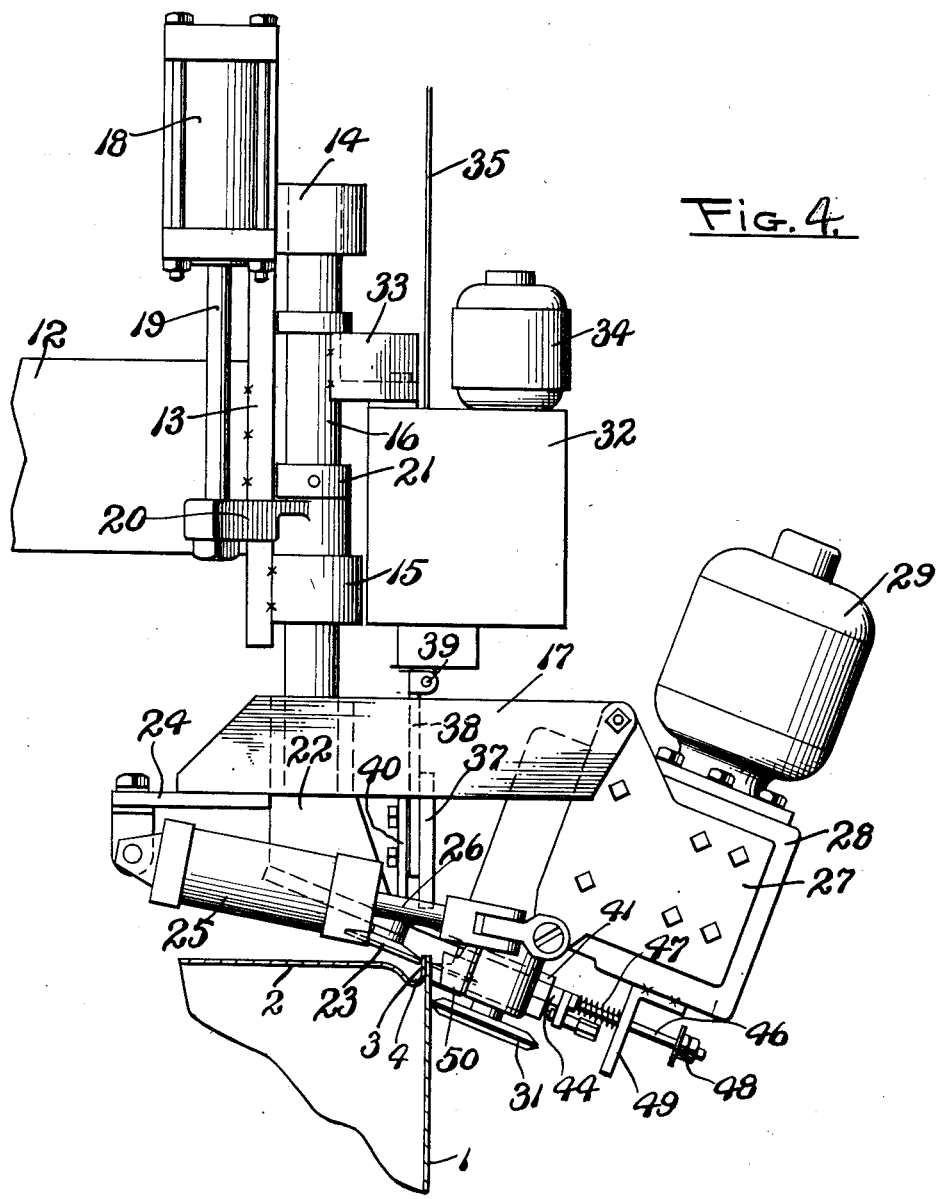
Fig. 4 is a view similar to Fig. 3 but with the welding unit lowered into operative position and engaged with the upper end of the tank and the end closure as it is during the process of welding.

The welding unit is lowered to the position shown in Figs. 4, 6 and 7, bringing the idle roller 23 within the inner side of the flange 3 of the end closure member 2. The rollers 31 and 45 are spaced a distance outwardly, as in Fig. 8, and the bars 36, 37 and 40 and the parts connected with the bar 40 remain in the outer position until pressure fluid enters the inner end of the cylinder 25 to move the piston rod 26 to the left (Fig. 3), whereupon the driving rollers 31 contact and press against the outer side of the walls of the tank body 1, as in Fig. 6 and the flange 3 and the adjacent outer rollers 23 and 45. The holder 50 for the flux 52 is brought to its operative position where it retains the flux delivered to it.

Upon driving the rollers 31 from the electric motor 29, the welding unit (or other fusing unit used) is moved around the upper end of the tank body 1, remaining in operative relation thereto. The carriage 10 turns about the axis of the pin 11, and the bar 12 moves as may be required in the direction of its length on the carriage. In this manner the welding fixture traverses the distance around the upper end of the tank, and there is a continuous movement of the welding rod, maintained at proper arc producing distance, from the upper edges of the walls of the tank body 1 and of the flange 3. At the completion of a circuit of the upper end of the tank, the end closure member is welded to the tank body entirely around it. Pressure fluid may then be entered in the lower end of the cylinder 18 to lift the welding unit above the upper end of the tank and the tank reversed in position for welding an end closure therein. Or a complete tank with its attached end closures may be removed. The cycle described is repeated upon a welding of an end closure into the open end of a tank body. Such repeating of the operation cycle is continued as long as there is work to be processed.

It will be noted that when, upon entrance of pressure fluid into the cylinder 25, the gear housing 28 and parts attached therewith are swung about the pivotal connection of the plate 27 to the bar 17, the bracket 49 comes against the outer end of the coiled spring 47, compressing it to thereby force the roller 45 against the outer side of the tank body 1 with yielding pressure. It is of course to be understood that the control of operation of the motors 29 and 34 and of the entrance and exhaust of pressure fluid in connection with the cylinders 18 and 25 is at the proper times, which may be either automatic or under manual control. Such control specifically as to structure is not essential to the present invention, numerous variations in such control being within the ability of those skilled in the art.

The mechanism described, particularly the controlling and monitoring mechanism in practical use, has proven extremely satisfactory for very rapidly and expeditiously fusibly connecting the ends of sheet metal tanks with the drums therefor and the like, producing strong, sturdy, dependable leakproof joints.

The connection which has been specifically described as done by electric arc welding, of course is not limited to arc welding alone, as the monitoring and control of the movement of the fusing unit, whether arc welding or otherwise to properly maintain position with respect to the joint is the same irrespective of the type of fusing which takes place. It is to be understood that in the use of the term "fusing," it is to mean those joinings together of the metal where the finished joint produced is to all practical purposes integral in effect with the metal parts joined, and which may be produced by an electric arc welding, brazing, soldering, oxy-acetylene welding and other ways of supplying the heat and/or welding material necessary for the welding, soldering, brazing and other equivalent connection and is to be considered a generic term inclusive of all of them.

Because of the rapidity of operation, the cost in connection with manufacturing of tanks, drums and the like is greatly reduced and high quantity production is attained.

The invention is defined in the appended claims and is to be considered comprehensive of all forms of structure coming within their scope.

I claim:

1. A machine for automatic fusing of the upper edge of a vertical flange comprising, a head, means for supporting said head for universal movement in a horizontal plane, a pilot member fixed to said head and traversably contacting an inner surface of said flange, a driving member movably connected to the head and traversably contacting an outer surface of the flange, means for driving the driving member at uniform speed, a support movably mounted on said head independent of the driving member, a locating member mounted on said support and traversably contacting the outer surface of the flange directly opposite said pilot member, a guide for a fusing element fixed to said support above the edge of the flange and in alignment between the axis of the pilot member and locating member, and means for moving said support and holding said locating member against said flange whereby said guide is accurately located relative to said flange during traversing movement.

2. The elements of claim 1 combined with means for raising and lowering said head between fusing operations.

3. The elements of claim 1 in which said means for moving said support also moves and holds said driving member into contact with said flange with a yieldable pressure connection between said driving member and said support.

4. The elements of claim 1 in which said driving member comprises two wheels spaced equidistant at opposite sides of said locating member.

5. The elements of claim 4 in which both of said two wheels exert driving propulsion to said head at a speed which is the average speed of the two wheels, whereby said support carrying said guide and locating member travels at a uniform speed along flange surfaces of any contour.

6. A machine for fusing the upper edge of a vertical flange comprising, a carriage mounted for rotation on a vertical axis above said flange, a bar slidable in a horizontal plane on said carriage, a head pivotally connected on a vertical axis to said bar, means on said head, movable relative to each other for traversably contacting opposite vertical surfaces of said flange, one of said means being a driving member and the other a pilot member, a support movably mounted on said head, a locating member mounted on said support and traversably contacting said flange directly opposite said pilot member and a guide for a fusing element located above said flange and connected to said support in fixed relation to said locating member and in alignment with the axes of the pilot member and the locating member.

7. The elements of claim 6 combined with means for raising and lowering said head on said bar between fusing operations.

8. The elements of claim 6 in which said driving member and said locating member are movable independently toward and from the flange, and means for moving both of them with a yieldable connection between them.

HORACE ADRIAN OSBORNE.

REFERENCES CITED

The following references are of record in the file of this patent:

UNITED STATES PATENTS

| Number | Name | Date |
| --- | --- | --- |
| 1,172,933 | Bucknam | Feb. 22, 1916 |
| 1,539,383 | Bienenstok | May 26, 1925 |
| 2,430,055 | Kennedy | Nov. 4, 1950 |
| 2,508,730 | Stone | May 23, 1950 |
| 2,529,812 | Peters | Nov. 14, 1950 |
| 2,546,116 | West et al. | Mar. 20, 1951 |